United States Patent [19]
Tani et al.

[11] Patent Number: 5,428,212
[45] Date of Patent: Jun. 27, 1995

[54] ENCODED SYMBOL READER

[75] Inventors: Nobuhiro Tani; Shuzo Seo, both of Tokyo, Japan

[73] Assignee: Asahi Kogaku Kogyo Kabushiki Kaisha, Tokyo, Japan

[21] Appl. No.: 170,414

[22] Filed: Dec. 20, 1993

[30] Foreign Application Priority Data

Dec. 21, 1992 [JP] Japan .................. 4-356318

[51] Int. Cl.⁶ .................................... G06K 7/10
[52] U.S. Cl. .................................... 235/472
[58] Field of Search .................. 382/59; 235/472, 462

[56] References Cited

U.S. PATENT DOCUMENTS

| | | | |
|---|---|---|---|
| 4,418,277 | 11/1983 | Tremmel et al. | 235/472 |
| 4,819,083 | 4/1989 | Kawai et al. | 382/59 |
| 4,983,818 | 1/1991 | Knowles | 235/467 |
| 5,121,226 | 6/1992 | Kubota et al. | 382/59 |

FOREIGN PATENT DOCUMENTS

| | | | |
|---|---|---|---|
| 385478 | 9/1990 | European Pat. Off. | 235/462 |
| 129871 | 10/1980 | Japan | 382/59 |
| 161085 | 9/1983 | Japan | 382/59 |
| 253483 | 10/1988 | Japan | 235/462 |
| 100684 | 4/1989 | Japan | 385/59 |
| 113581 | 5/1991 | Japan | 235/462 |
| 205580 | 7/1992 | Japan | 235/462 |

Primary Examiner—John Shepperd
Attorney, Agent, or Firm—Kane, Dalsimer, Sullivan, Kurucz, Levy, Eisele and Richard

[57] ABSTRACT

An encoded symbol reader capable of reading an illuminated encoded symbol having a two dimensional tessellated pattern code, includes a CCD for scanning a predetermined area and an LCD panel for displaying the area being scanned by the CCD. The LCD panel displays a positional relationship between the encoded symbol being scanned and the boundary of the predetermined area that is being scanned.

13 Claims, 7 Drawing Sheets

ENCODED SYMBOL READER

FIELD OF THE INVENTION

The present invention relates to an encoded symbol reader for reading encoded symbols such as bar codes or tessellated pattern codes, which are an encoded representation of alphanumeric information.

BACKGROUND OF THE INVENTION

There are available hand-held encoded symbol readers which have an image sensor such as a charge-coupled device (CCD) for reading and decoding two dimensional encoded symbols such as bar codes or tessellated pattern codes having a grid-like pattern of white and black areas, where the pattern changes in both the horizontal (X-axis) and vertical (Y-axis) directions.

One general hand-held encoded symbol reader has a casing with an opening defined at one end which is covered with a transparent plastic panel. The casing houses therein a CCD image sensor facing the opening and electrically connected to a signal processor, a plurality of light-emitting diodes (LEDs), and a condensing lens positioned in front of a photodetector surface of the CCD. Light is emitted from the LEDs and applied through the opening to a two-dimensional encoded symbol such as a bar code that is to be read by the encoded symbol reader. The light is reflected by the encoded symbol back into the opening, and focused by the condensing lens onto the photodetector surface of the CCD. The CCD converts the applied light into image signals, which are then converted by the signal processor into a digital signal. The digital signal then decoded, and the original alphanumeric information can be retrieved.

When the encoded symbol is read by the encoded symbol reader, the entire encoded symbol has to be positioned within the readable range of the CCD because the encoded symbol has pattern that varies in the horizontal and vertical directs as described above. Therefore, it is necessary to properly position the encoded symbol reader with respect to the encoded symbol.

Conventionally, the only way to confirm whether the encoded symbol has been properly positioned within the readable range of the CCD has been to check if the encoded symbol has been properly decoded. Specifically, the operator can recognize that the encoded symbol has been properly positioned within the readable range of the CCD only after the alphanumeric information decoded from the encoded symbol is displayed or successful decoding is audibly indicated.

Therefore, the operator has to move the encoded symbol reader over the encoded symbol, wait to see whether the encoded symbol is properly decoded, and then reposition the encoded symbol reader until the encoded symbol is properly decoded. This can be a time-consuming and tedious process and leads to a loss in efficiency when using the encoded symbol reader.

SUMMARY OF THE INVENTION

It is therefore an object of the present invention to provide an encoded symbol reader which allows the operator to position the encoded symbol reader quickly and accurately in order to read an encoded symbol.

According to an aspect of the present invention, there is provided an encoded symbol reader capable of reading an illuminated encoded symbol comprising:

scanning means having a predetermined scanning area, said scanning means detects an optical image reflected by said encoded symbol and which is within said predetermined scanning area, said scanning means outputs data corresponding to said detected optical image; and display means for displaying said data output by said scanning means, whereby said display means displays a positional relationship between said encoded symbol and said scanning area.

According to another aspect of the present invention, there is also provided an encoded symbol reader comprising:

scanning means that scans a predetermined area, said scanning means outputting data corresponding to a scanned image;

light emitting means for illuminating an area to be scanned by said scanning means;

conversion means for converting said data output by said scanning means into binary data;

processing means for processing said binary data, to obtain data representing a peripheral boundary of said output data;

display means for displaying said peripheral boundary data, wherein said display means displays a positional relationship between said peripheral boundary data and said predetermined area.

According to still another aspect of the present invention, there is provided an encoded symbol reader comprising:

an image sensor for photoelectrically converting light reflected by an encoded symbol into image information representative of the encoded symbol, said image sensor having a readable range for effectively reading the encoded symbol therein; and display means for displaying said image information with respect to said readable range.

According to a further aspect of the present invention, there is provided an encoded symbol reader comprising:

an image sensor for photoelectrically converting light reflected by an encoded symbol into image information representative of the encoded symbol, said image sensor having a readable range for effectively reading the encoded symbol therein; and display means for compressing the image information from said image sensor, and displaying the compressed image information with respect to said readable range.

According to a still further aspect of the present invention, there is provided an encoded symbol reader comprising:

imaging means for producing an image signal from light reflected by an encoded symbol;

first processing means for generating image data representative of a two-dimensional pattern of the encoded symbol from said image signal;

second processing means for generating alphanumeric information borne by said encoded symbol from said image signal; and display means for selectively displaying said image data and said alphanumeric information.

DESCRIPTION OF THE EMBODIMENTS

Figure 1:
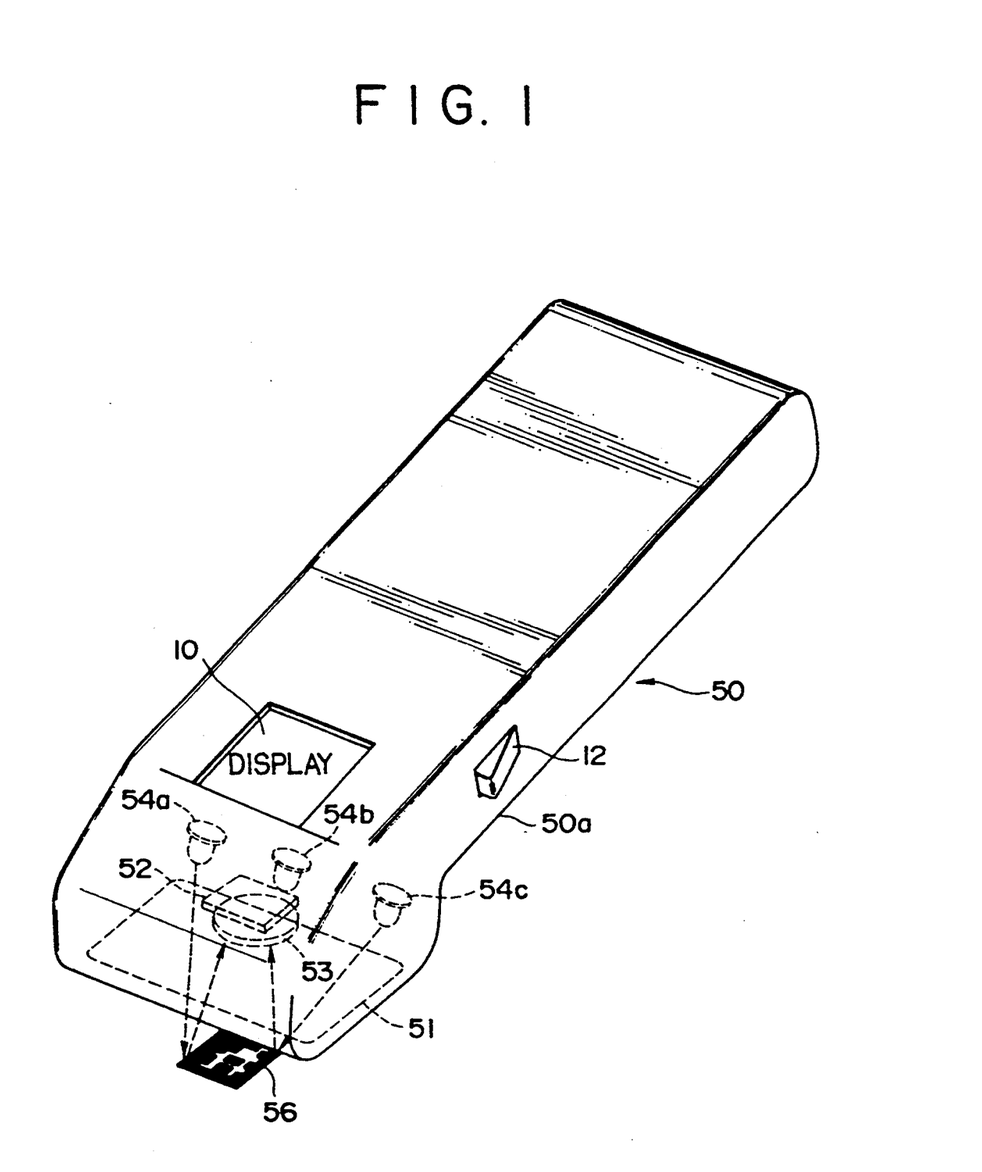
FIG. 1 is a perspective view of an encoded symbol reader according to an embodiment of the present invention.

As shown in FIG. 1, an encoded symbol reader 50 according to an embodiment of the present invention has a casing 50a with an opening 51 defined in a lower end surface thereof which is covered with a transparent plastic panel. The casing 50a houses therein a CCD 52 image sensor facing the opening 51, a plurality of light-emitting diodes (LEDs) 54a, 54b, 54c, and a condensing lens 53 positioned in front of a photodetector surface of the CCD 52.

Light is emitted from the LEDs 54a, 54b, 54c and applied through the opening 51 to a two-dimensional encoded symbol 56 such as a tessellated pattern code or mosaic pattern code, that is to be read by the encoded symbol reader 50. The light is reflected by the encoded symbol 56 back into the opening 51, and focused by the condensing lens 53 onto the photodetector surface of the CCD 52.

The encoded symbol reader 50 also has a liquid-crystal display (LCD) panel 10 on an upper surface of the casing 50a and a trigger switch 12 on a side surface of the casing 50a. The LCD panel 10 is disposed on the upper surface such that it is aligned with the area detected (i.e., scanned) by the CCD 52. This creates a virtual window over the area being scanned since the display on the LCD panel 10 represents information that is being scanned by the CCD 52.

Figure 2:
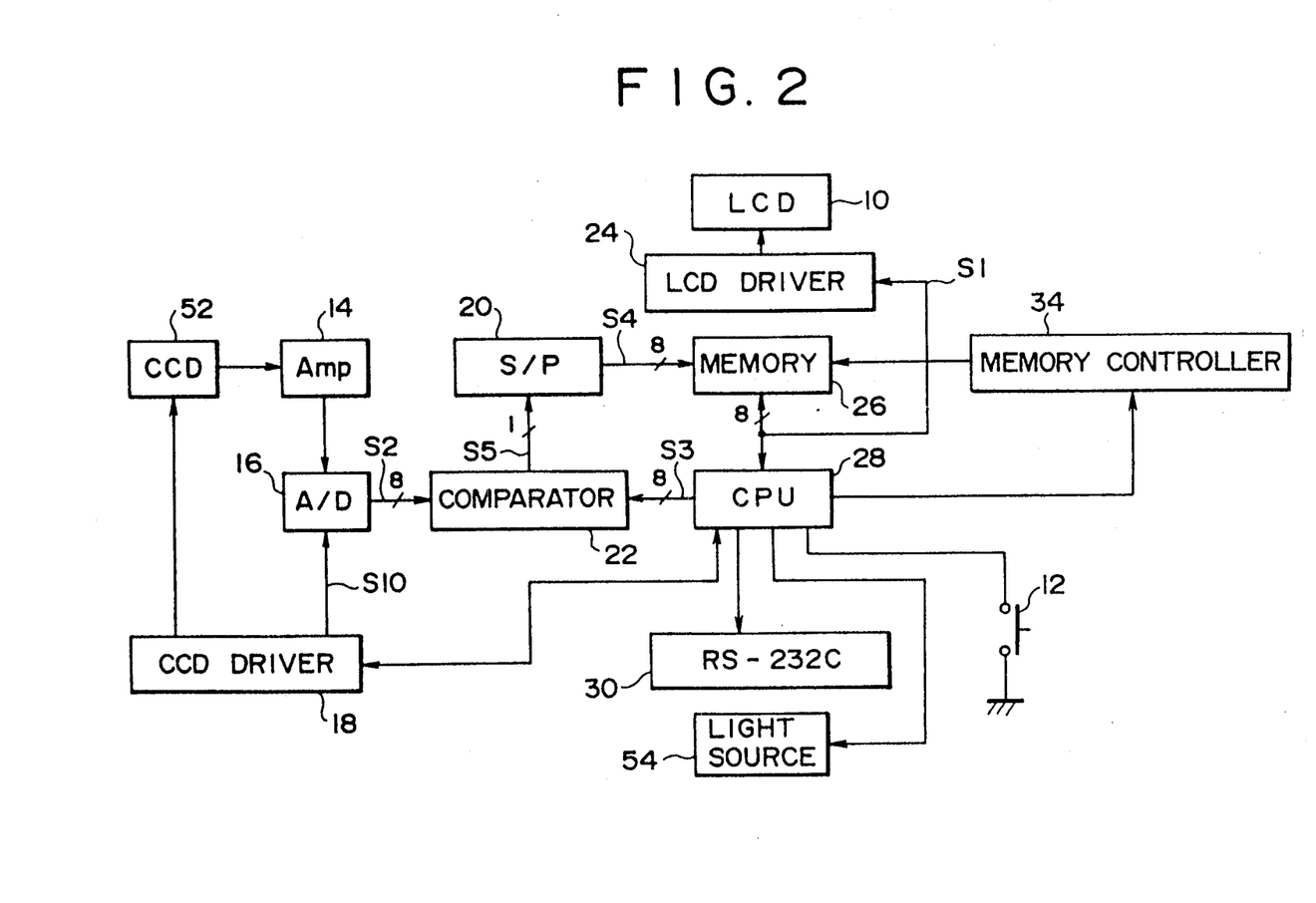
FIG. 2 is a block diagram of the encoded symbol reader shown in FIG. 1.

FIG. 2 shows in block form a circuit arrangement of the encoded symbol reader 50.

As shown in FIG. 2, the CCD 52 is connected to a CCD driver 18 which supplies various signals including drive pulses and shift pulses and a reset signal to the CCD 52 to drive the CCD 52 to output pixel signals. The CCD 52 is also connected to an amplifier 14 which amplifies the pixel signals from the CCD 52. The amplifier 14 is connected to an analog-to-digital (A/D) converter 16 which converts the amplified pixel signals into 8-bit digital image data.

The A/D converter 16 is connected to a comparator 22 by an 8-bit data signal line S2 and also to the CCD driver 18 by a control line S10. The A/D converter 16 is controlled by a timing signal supplied from the CCD driver 18 over the control line S10 to sample and hold the pixel signals from the amplifier 14 and convert the sampled pixel data into 8-bit digital pixel data.

The comparator 22 is connected to a serial-to-parallel (S/P) converter 20 by a 1-bit data signal line S5 and also to a central processing unit (CPU) 28 by an 8-bit data signal line S3. The comparator 22 compares the 8-bit pixel data from the A/D converter 16 with an 8-bit digital threshold level data supplied from the CPU 28 and converts the 8-bit pixel data into 1-bit binary data. The comparator 22 supplies the 1-bit binary data to the S/P converter 20, which converts the supplied 1-bit binary data into 8-bit parallel data.

The S/P converter 20 is connected to a memory 26 by an 8-bit data signal line S4. The memory 26 is connected to a memory controller 34. The memory 26 is also connected to the CPU 28 and an LCD driver 24 by an 8-bit data bus S1. The memory 26 writes the 8-bit data from the S/P converter 20 into memory addresses thereof and reads the stored data into the LCD driver 24 or the CPU 28 according to a read/write timing signal from the memory controller 34. The LCD driver 24 is connected to the LCD 10 for controlling the LCD 10 to display image information in the form of a dot-matrix pattern based on the 8-bit data supplied from the memory 26.

The CPU 28 is connected to the CCD driver 18, an RS-232C driver 30, a light source 54 which is composed of the LEDs 54a, 54b, 54c, the trigger switch 12, and the memory controller 34. The CPU 28 controls energization and de-energization of the light source 54, outputs a command signal to the CCD driver 18 to read pixel signals from the CCD 52, and supplies command signals to the memory controller 34 to write data in and read data from the memory 26. The CPU 28 also outputs command signals to the RS-232C driver 30 to transmit data to and receive data from a host computer (not shown) connected to the encoded symbol reader 50.

Now, operation of the encoded symbol reader 50 shown in FIGS. 1 and 2 will be described below with reference to FIGS. 3 and 4(a) through 4(f).

Figure 3:
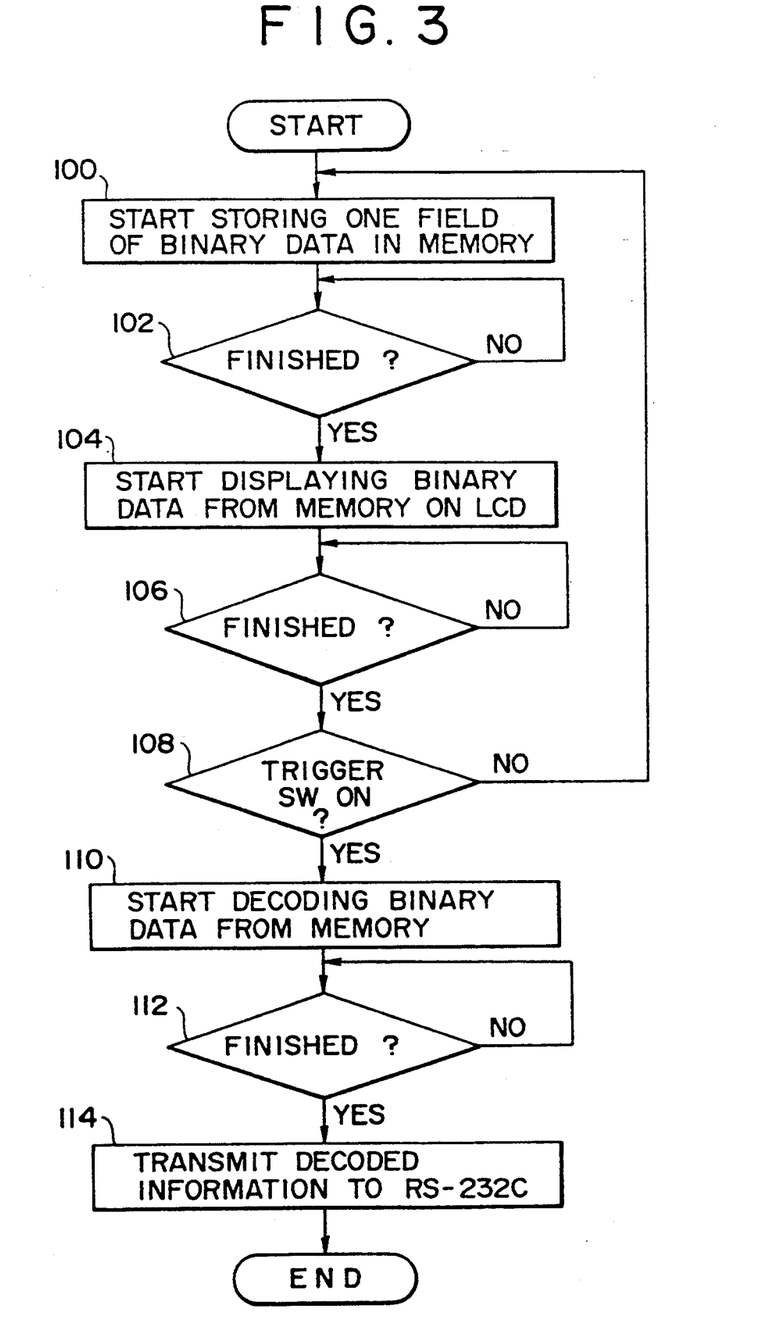
FIG. 3 is a flowchart of an operation sequence of the encoded symbol reader shown in FIG. 1.

FIG. 3 shows an operation sequence of the encoded symbol reader 50. First, the CPU 28 energizes the light source 54, and instructs the CCD driver 18 to start one field of pixel data from the CCD 52 in a step 100. Specifically, when the light source 54, i.e., the LEDs 54a, 54b, 54c, is energized, light is applied from the LEDs 54a, 54b, 54c to the two-dimensional encoded symbol or code 56. The light is reflected by the encoded symbol 56, enters the opening 51, and is focused onto the photodetector surface of the CCD 52 by the condensing lens 53.

The photodetector surface of the CCD 52 comprises a two-dimensional array of photoelectric transducers for converting received light into a signal for each pixel. Each pixel signal is outputted to the amplifier 14 according to shift and drive pulses supplied from the CCD driver 18 to the CCD 52.

The pixel signals are amplified by the amplifier 14 to a level suitable for processing by the A/D converter 16, and then outputted to the A/D converter 16. The A/D converter 16 samples and holds the amplified pixel signals in response to a timing signal from the CCD driver 18, and converts the sampled pixel data into 8-bit digital pixel data.

The digital pixel data are then supplied from the A/D converter 16 to the comparator 22, which compares the supplied digital pixel data with an 8-bit digital threshold supplied from the CPU 28 and converts the digital pixel data into 1-bit binary data each pixel. The 1-bit binary data are successively outputted to the S/P converter 20. Since the encoded symbol pattern is composed of black and white areas, then the data read by the CCD 52 must indicate either a black or white area. Therefore the 8-bit data that represents each pixel is compared with a threshold level and a determination is made whether the area is black or white. The comparator 22 thus outputs a 1 or 0 depending on the whether the 8-bit data is above or below the threshold level, respectively.

The S/P converter 20 accumulates successive 1-bit binary data representative of 8 pixels, and converts them into 8-bit parallel data, which are then supplied to tile memory 26. Thus each 8-bit data stored in the memory 26 is composed of 8 binary data for 8 successive pixels. Therefore tile memory 26 can quickly store the binary data for every pixel.

The 8-bit parallel data supplied to the memory 26 are successively written in respective memory addresses under the control of the memory controller 34. In response to a data write command signal from the CPU 28, the memory controller 34 indicates the memory address for each 8-bit data item to the memory 26 and outputs a write signal to the memory 26.

The CCD driver 18 counts shift and drive pulses outputted to the CCD 52 to determine whether the reading of one field of pixel signals is completed. When the CCD driver 18 finishes the supply of shift and drive pulses to read one field of pixel signals, the CCD driver 18 sends a completion signal to the CPU 28 that indicates that one field of pixels has been read. The CPU 28 waits until it receives this completion signal ("No" in a step 102) from the CCD driver 18.

When one field of pixel signals has been read from the CCD 52, converted into digital data by the A/D converter 16, converted into binary data by the comparator 22, converted into parallel data by the S/P converter 20, and stored in the memory 26 ("Yes" in the step 102), the CPU 28 output a command signal to instruct the memory controller 34 to read the stored data from the memory 26. In response to the command signal, the memory controller 34 sends successive memory addresses to the memory 26 and outputs a read signal instructing the memory 26 to output the 8-bit pixel data.

The 8-bit pixel data read from the memory 26 is supplied to the LCD driver 24 over the 8-bit data bus S1. The LCD driver 24 controls the LCD panel 10 to start displaying the supplied pixel data as image information in the form of a dot-matrix pattern in step 104.

Figure 4A:
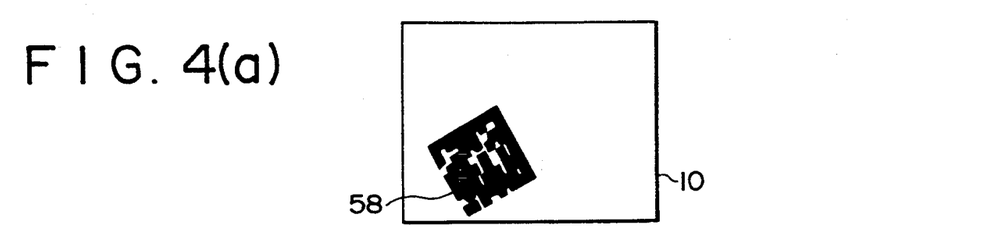
FIGS. 4(a) through 4(e) are views showing, by way of example, images displayed according to the present invention.
Figure 4B:
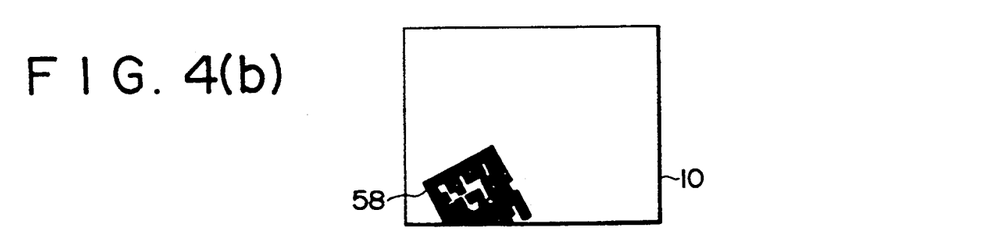

An example of image information displayed on the LCD panel 10 is shown in FIG. 4(a). As illustrated, a dot-matrix pattern 58 of the two-dimensional encoded symbol 56 is displayed on the LCD panel 10. The entire image display area of the LCD panel 10 represents a two-dimensional range that can be read by the CCD 52. Therefore, if the two-dimensional encoded symbol 56 is positioned within the readable range of the CCD 52, then the LCD 10 displays the entire dot-matrix pattern 58 of the two-dimensional encoded symbol 56.

If the entire two-dimensional encoded symbol 56 is not positioned within the readable range of the CCD 52, then only the portion of the encoded symbol 56 that was read will be displayed on the LCD panel 10. Consequently, the operator of the encoded symbol reader 50 can recognize the position of the encoded symbol reader 50 with respect to the encoded symbol 56 by visually observing the dot-matrix pattern 58 as it is displayed on the LCD panel 10. Therefore, the operator can readily confirm whether the encoded symbol reader 50 is in a position to properly read the encoded symbol 56, simply by looking at the LCD panel 10.

When the operator confirms that the encoded symbol 56 is positioned within the readable range of the CCD 52, the operator presses the trigger switch 12 to enable the encoded symbol reader 50 to read and decode the two-dimensional encoded symbol 56.

When the display of one field of pixel signals on the LCD 10 is completed ("Yes" in a step 106), then the CPU 28 determines whether the trigger switch 12 is turned on in step 108. If not turned on, then control goes back to the step 100 to energize the light source 54, read a new field of pixel signals from the CCD 52, convert the pixel signals into binary data, and store the binary data in the memory 26.

If the trigger switch 12 is turned on, then the CPU 28 starts to decode the encoded symbol 56 based on the binary data stored in the memory 26 in step 110. Specifically, the CPU 28 extracts pixel data corresponding to the encoded symbol 56 from the binary data stored in the memory 26, and decodes the extracted pixel data into alphanumeric information representing the bit pattern of the extracted pixel data.

The decoded alphanumeric information is stored in a memory in the CPU 28 or a new area in the memory 26. When the decoding of the extracted pixel data is completed ("Yes" in a step 112), the CPU 28 transmits the decoded alphanumeric information to the RS-232C driver 30, which sends the alphanumeric information to the host computer in a step 114. At this time, the decoded alphanumeric information may be displayed on the LCD panel 10. Thereafter, the CPU 28 starts to execute the sequence again from the step 100.

As described above, each field of pixel data is read from the CCD 52, converted into binary data, stored in the memory 26, and displayed on the LCD panel 10. When the trigger switch 12 is turned on, the two-dimensional encoded symbol 56 is decoded based on the pixel data that are stored in the memory 26 at the time into alphanumeric information, which is transmitted to the host computer.

Therefore, by visually confirming the dot pattern 58 displayed on the LCD panel 10, the operator can determine whether the two-dimensional encoded symbol 56 is positioned properly in the readable range of the CCD 52 or not, and, if not, can quickly move the encoded symbol reader 50 to a position in which it can read the two-dimensional encoded symbol 56. The total period of time which is required to move the encoded symbol reader 50 to a position in which it can read the two-dimensional encoded symbol 56, to read the two-dimensional encoded symbol 56, to decode the pixel data, and to transmit the decoded alphanumeric information to the host computer, can therefore be shortened. Therefore, the operator can use the encoded symbol reader 50 smoothly and efficiently.

The LCD panel 10 may comprise a dot-matrix LCD panel. If a dot-matrix LCD panel is used as the LCD panel 10, then since there is a certain limitation on the number of pixels that can be displayed, the image information outputted from the memory 26 to the LCD driver 24 may be reduced for display.

The digital threshold supplied from the CPU 28 to the comparator 22 is not limited to a fixed digital threshold, but may vary depending on the correlation between pixels stored in the memory 26 or the level of the output signal from the amplifier 14, i.e., may have hysteresis properties.

Figure 5:
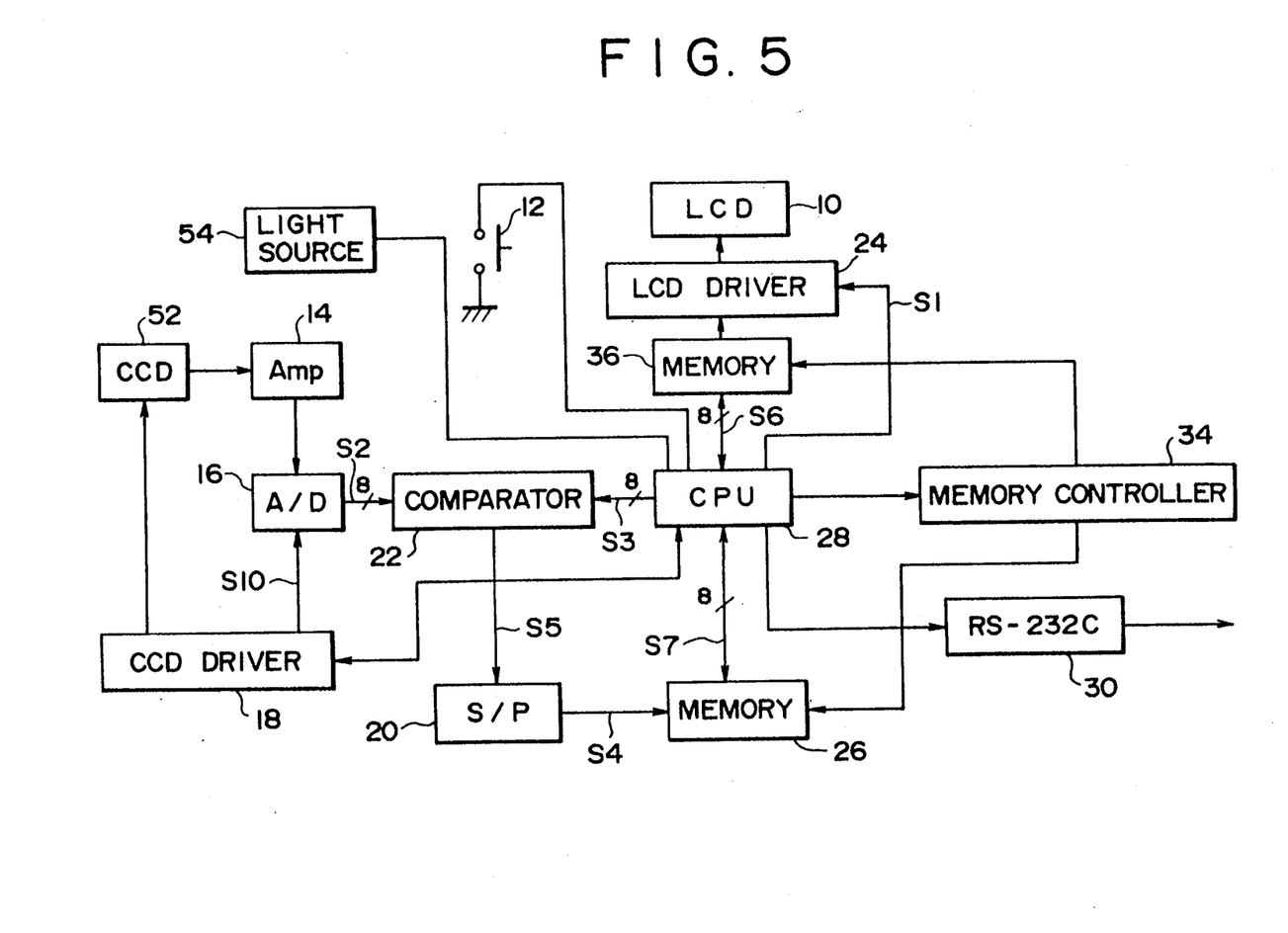
FIG. 5 is a block diagram of an encoded symbol reader according to another embodiment of the present invention.

FIG. 5 shows in block form a circuit arrangement of an encoded symbol reader according to another embodiment of the present invention.

The encoded symbol reader shown in FIG. 5 differs from the encoded symbol reader shown in FIG. 2 in that the memory 26 is connected to the CPU 28 by an 8-bit data signal bus S7 and a memory 36 is connected to the CPU 28 by an 8-bit data signal bus S6 and also to the LCD driver 24. The memory 36 serves as a work memory of the CPU 28. The memories 26, 36 are connected to the memory controller 34 which controls the memories 26, 36 to read and write data.

Operation of the encoded symbol reader shown in FIG. 5 will be described below.

Figure 6:
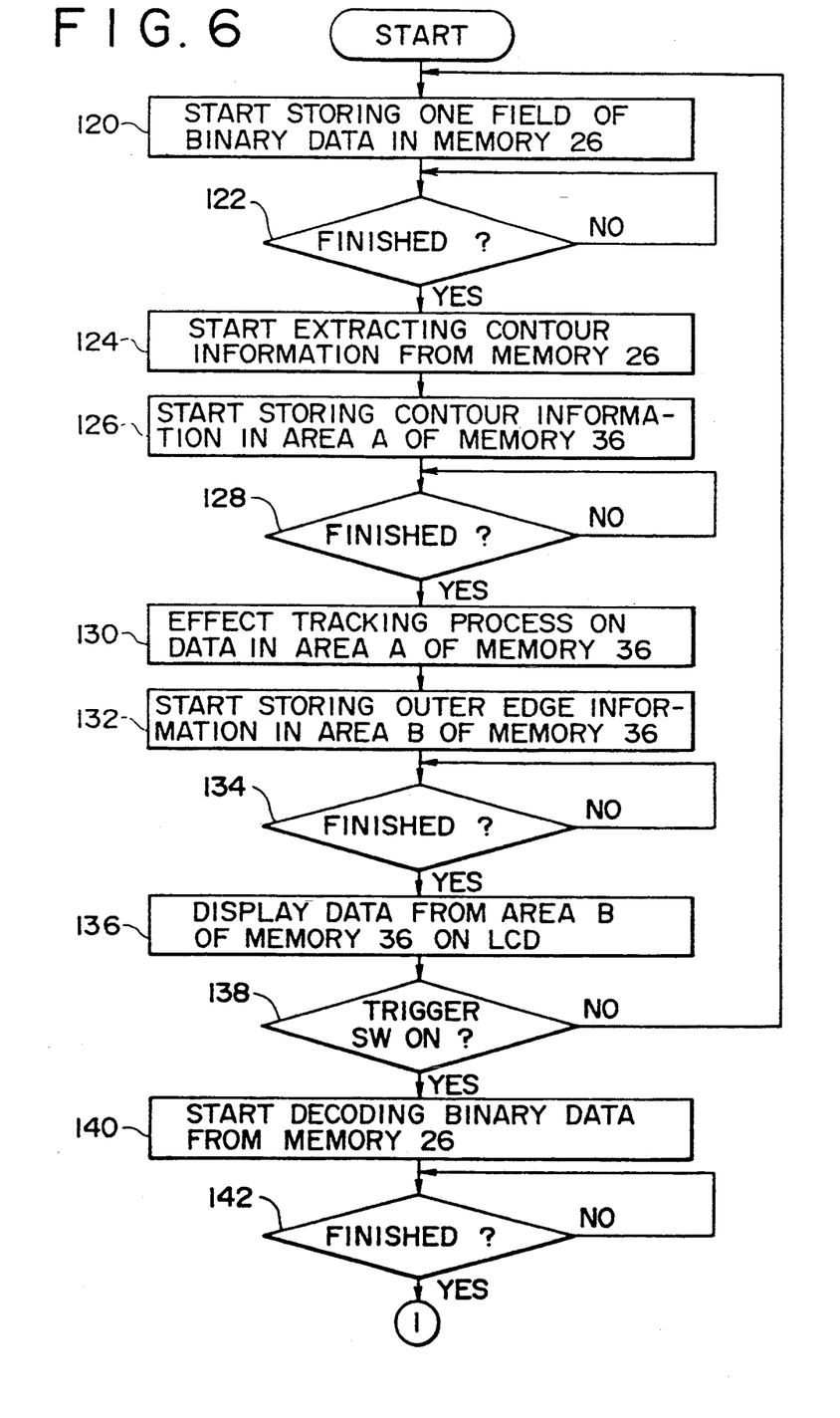
FIGS. 6 and 7 are a flowchart of an operation sequence of the encoded symbol reader shown in FIG. 5.

FIG. 6 shows an operation sequence of the encoded symbol reader shown in FIG. 5. The CPU 28 instructs the CCD driver 18 to start one field of pixel data from the CCD 52 in a step 120. The CCD driver 18 applies shift and drive pulses to the CCD 52 to successively output pixel signals to the amplifier 14.

The pixel signals are amplified by the amplifier 14, and converted into 8-bit digital pixel data by the A/D converter 16.

The digital pixel data are then compared by the comparator 22 with an 8-bit digital threshold supplied from the CPU 28. The comparator 22 converts the digital pixel data into 1-bit binary data for the respective pixels. The 1-bit binary data are successively outputted to the S/P converter 20. The S/P converter 20 accumulates successive 1-bit binary data representative of 8 pixels, and converts them into 8-bit parallel data, which are then supplied to the memory 26. The 8-bit parallel data supplied to the memory 26 are successively written in respective memory addresses under the control of the memory controller 34.

When one field of image information has been stored in the memory 26, the CCD driver 18 sends a completion signal to the CPU 28. Upon completion of the reading of one field of image information ("Yes" in a step 122), the CPU 28 successively reads 8-bit binary data from the memory 26 and starts to extract contour information of the two-dimensional encoded symbol 56 from the read binary data in a step 124. Contour information refers to the line that separates the black and white areas of the two-dimensional pattern.

The process of extracting contour information will be described below.

Each bit of the 8-bit binary data stored in the memory 26 is related in one-to-one correspondence to one pixel of the image information of one field read from the CCD 52. Thus, a bit value "1" corresponds to a dark area of an encoded symbol such as a bar code, and a bit value "0" corresponds to a bright area thereof.

The bits of the 8-bit binary data stored in the memory 26 are successively scanned to look for bit positions or pixels having the bit value "1".

When a pixel P0 (m, n) having the bit value "1" is detected, the bit values of four pixels P (m−1, n), P (m+1, n), P (m, n−1), P (m, n+1) around the pixel P0 (m, n), or the bit values of those four pixels and an additional four pixels P (m−1, n−1), P (m+1, n−1), P (m−1, n+1), P (m+1, n+1) are checked clockwise or counterclockwise. The variables m, n represent coordinates on the original symbol image, and are in the ranges $0 \leq m \leq X$, $0 \leq n \leq Y$ where X is the maximum number of horizontal pixels in one image field and Y is the maximum number of vertical pixels in one image field.

An adjacent pixel P1 located at one of the coordinates described above is examined. If it is "1" the next adjacent pixel is examined. When one of the adjacent pixels is "0" the pixel P0 is marked. Then the process is repeated for the next pixel in the scanning line having the bit value "1". This continues until all pixels having the bit value "1" and their adjacent pixels have been examined. Then co-ordinates of the marked pixels are stored in an area A of memory 36 in step 126.

Figure 4C:
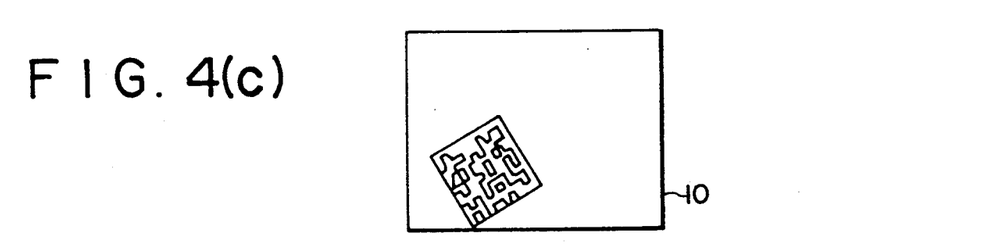

When the above scanning and examination process is finished with respect to all pixels in the memory 26, the contour information of the two-dimensional encoded symbol 56 is extracted ("Yes" in a step 128). The contour line joining the marked pixels represents the boundary between the black and white areas of the encoded symbol. This is illustrated in FIG. 4(c). The extracted contour information is stored in the area A of the memory 36, but not displayed on the LCD panel 10.

When the writing of the contour line information into the area A of the memory 36 is completed, another image processing routine is carried out on the contour line information to determine the outermost boundary of the contour line. This outer edge information (hereinafter referred to as outline data) is stored in an area B of the memory 36 in step 132.

Figure 4D:
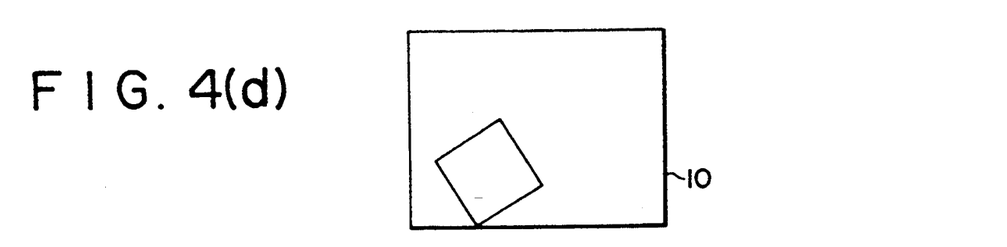

When this image processing routine is finished the memory controller 34 controls the memory 36 to read the data from the area B into the LCD driver 24. The LCD driver 24 displays the supplied data on the LCD panel 10 in step 136. An example of the outline data that is displayed on the LCD panel 10 is shown in FIG. 4(d). However the contour information shown in FIG. 4(c) may be displayed on the LCD panel 10 in step 136. In this case, the memory controller 34 reads the data from the area A of the memory 36, and supplies the data to the LCD driver 24 for display on the LCD panel 10.

Figure 7:
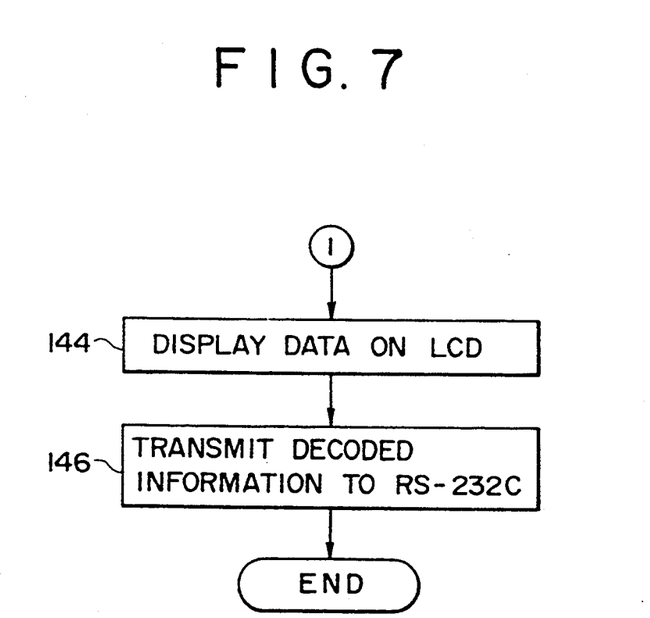

Thereafter, the CPU 28 determines whether the trigger switch 12 is turned on in step 138. If it is not turned on, then control goes back to the step 120 to repeat the above steps. If the trigger switch 12 is turned on, then the CPU 28 starts to decode the two-dimensional encoded symbol 56 into alphanumeric information based on the binary data stored in the memory 26 in a step 140.

Figure 4E:
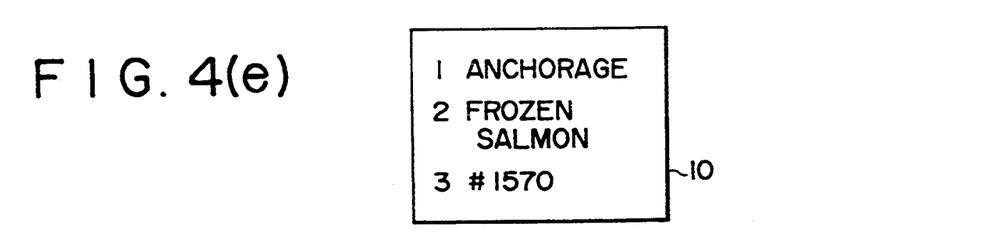

When the decoding of the two-dimensional encoded symbol 56 is completed ("Yes" in a step 142), the CPU 28 transmits the decoded alphanumeric information to the LCD driver 24, which displays the alphanumeric information on the LCD panel 10 in a step 144. The displayed alphanumeric information is shown by way of example in FIG. 4(e). The alphanumeric information shown in FIG. 4(e) represents the two-dimensional encoded symbol 56 that has been read by the CCD 52.

The CPU 28 also outputs the decoded alphanumeric information to the RS-232C driver 30, which sends the alphanumeric information to the host computer in step 146.

In the embodiment shown in FIGS. 5 through 7, as described above, contour line information is extracted from the image information in the steps 130, 132, and only the outer edge information is displayed on the LCD panel 10 as shown in FIG. 4(d). The displayed outer edge information is sufficient for the operator to visually recognize the position of the two-dimensional encoded symbol 56 relatively to the readable range of the CCD 52. Further, since the amount of data is limited, it can be updated more quickly on the LCD screen.

In the illustrated embodiments, the pixel signals are outputted from the CCD 52 at all times, and one field of binary image data produced from the pixel signals is displayed on the LCD panel 10. However, an image reading switch may be disposed on an outer surface of the encoded symbol reader 50, and only when the image reading switch is turned on, will the CPU 28 control the light source 54 to emit light, the CCD 52 to repeatedly read the image of the two-dimensional encoded symbol 56 for a given period of time, and the LCD panel 10 to display binary image data of the image that has been read. When the trigger switch 12 is turned on within the given period of time, the CPU 28 may decode the two-dimensional encoded symbol 56 based on the image which is read at the time the trigger switch 12 is turned on, control the LCD panel 10 to display the decoded information, and transmit the decoded information to the host computer. If the trigger switch 12 is not turned on while the image of the two-dimensional encoded symbol 56 is being repeatedly read, then, after elapse of a certain period of time, the CPU 28 may de-energize the light source 54 and stop reading the pixel data from the CCD 52 for thereby reducing electric power consumption.

The light source 54 is not limited to the LEDs 54a, 54b, 54c, but may comprise any light source insofar as it can emit light having an intensity strong enough to irradiate a two-dimensional encoded symbol to be read and to cause the two-dimensional image sensor to store signal charges in a short period of time in response to light reflected from the two-dimensional encoded symbol. The light emitted by the light source 54 may be visible light or invisible radiation such as infrared radiation. However, the light source 54 is required to emit light having a wavelength that can be detected by the CCD 52 with a high sensitivity. If the CCD 52 has a high sensitivity with respect to the wavelength of an invisible radiation, then the light source 54 should emit such an invisible radiation.

The display panel for displaying the decoded alphanumeric information is not limited to the LCD panel, but may be any of various display devices such as an electroluminescent (EL) panel, a dot-matrix display panel, or the like. While in the illustrated embodiments the two-dimensional encoded code 56 is decoded based on its read image information within the encoded symbol reader, a bit pattern of the two-dimensional encoded code 56 may be extracted from the image information, transmitted to the host computer, and decoded by the host computer.

The principles of the present invention are also applicable to an encoded symbol reader which reads other encoded symbols such as one-dimensional bar codes.

The present disclosure relates to a subject matter contained in Japanese Patent Application No. HEI 4-356318, filed on Dec. 21, 1992, which is expressly incorporated herein by reference in its entirety.

What is claimed is:

1. An encoded symbol reader capable of reading an illuminated encoded symbol comprises:
   scanning means having a predetermined scanning area, said scanning means detects an optical image reflected by said encoded symbol and which is within said predetermined scanning area, said scanning means outputs data corresponding to said detected optical image;
   conversion means for converting said data output by said scanning means into binary data;
   decoding means for decoding said binary data, said decoding means outputting alphanumeric data corresponding to said binary data;
   display means for displaying said data output, whereby said display means displays a positional relationship between said encoded symbol and said scanning area and
   switch means for switching said display means wherein before said switch means is pressed, said display means displays said scanning means output data and wherein after said switch means is pressed, said display means displays said alphanumeric data.

2. The encoded symbol reader of claim 1 which further comprises light emitting means for illuminating said encoded symbol.

3. The encoded symbol reader of claim 1 wherein said scanning means is disposed on a surface of said encoded reader which faces an encoded symbol, and said display means is disposed on another surface of said encoded symbol reader which away from said encoded symbol, said display means disposed to be in alignment with said predetermined scanning area.

4. The encoded symbol reader of claim 1 wherein said encoded symbol is a tessellated pattern code.

5. An encoded symbol reader capable of reading an illuminated encoded symbol comprises:
   scanning means having a predetermined scanning area, said scanning means detects an optical image reflected by said encoded symbol and which is within said predetermined scanning area, said scanning means outputs data corresponding to said detected optical image;
   conversion means for converting said data output by said scanning means into binary data;
   decoding means for decoding said binary data, said decoding means outputting alphanumeric data corresponding to said binary data;
   display means for displaying said data output by said scanning means;
   whereby said display means displays a positional relationship between said encoded symbol and said scanning area; and
   processing means for processing said binary data to obtain data representing a peripheral boundary of said detected optical image.

6. The encoded symbol reader according to claim 3, further comprising decoding means for decoding said image information into alphanumeric information, said display means including means for displaying said alphanumeric information.

7. An encoded symbol reader comprises:
   scanning means that scans a predetermined area, said scanning means outputting data corresponding to a scanned image;
   light emitting means for illuminating an area to be scanned by said scanning means;
   conversion means for converting said data output by said scanning means into binary data;
   processing means for processing said binary data, to obtain data representing a peripheral boundary of said output data;
   display means for displaying said peripheral boundary data,
   wherein said display means displays a positional relationship between said peripheral boundary data and said predetermined area.

8. The encoded symbol reader of claim 7 which further comprises decoding means for decoding said binary data, said decoding means outputting alphanumeric data corresponding to said binary data.

9. The encoded symbol reader of claim 8 which further comprises switch means, wherein before said switch means is pressed, said display means displays said binary data, and wherein after said switch means is pressed, said display means displays said alphanumeric data.

10. The encoded symbol reader of claim 7 wherein said scanning means is disposed on a surface of said encoded reader which faces an encoded symbol, and said display means is disposed on another surface of said encoded symbol reader which away from said encoded symbol, said display means disposed to be in alignment with said predetermined area.

11. An encoded symbol reader comprising:
   an image sensor for photoelectrically converting light reflected by an encoded symbol into image information representative of the encoded symbol, said image sensor having a readable range for effectively reading the encoded symbol therein; and
   display means for compressing the image information from said image sensor, and displaying the compressed image information with respect to said readable range.

12. The encoded symbol reader according to claim 11, wherein said display means comprises:
   processing means for processing said image information into binary data;
   extracting means for extracting outer edge information of said encoded symbol from said binary data; and
   a display panel for displaying said outer edge information.

13. An encoded symbol reader comprising:
   imaging means for producing an image signal from light reflected by an encoded symbol;
   first processing means for generating image data representative of a two-dimensional pattern of the encoded symbol from said image signal;
   second processing means for generating alphanumeric information borne by said encoded symbol from said image signal; and
   display means for selectively displaying said image data and said alphanumeric information.

* * * * *